Patented Oct. 9, 1928.

1,687,210

UNITED STATES PATENT OFFICE.

WALTER ESTES HOLSCLAW AND HARRY ELSTON HOLSCLAW, OF EVANSVILLE, INDIANA.

PIPE AND TUBE BENDER.

REISSUED

Application filed December 6, 1927. Serial No. 238,157.

This invention relates to an improved portable pipe and tube bender.

The object of the invention is to provide a simple, inexpensive, light, portable machine which will be adapted for bending pipes and tubes of different sizes and materials and will be capable of manipulation by the hands of the operator without having to be attached to a bench, shelf, upright, or other support.

As hereinafter described in detail, the complete machine or appliance comprises a body having a tube or pipe engaging hook, a handle attached to, or formed integral with the body which may be grasped by one of the hands of the operator, a bending sheave provided with gear teeth or a mutilated gear, a pinion journalled in the body and adapted to mesh with the aforesaid gear teeth or mutilated gear and having a handle which may be grasped by the remaining hand of the operator, and a bending plate secured to the sheave as, for instance, to a flat part thereof, which is provided with a hook adapted to engage the tube or pipe when the latter is located between the hook on the body and the sheave, whereby when the handle for the pinion is turned in the proper direction, the bending plate will, by its grip on the tube or pipe, in conjunction with the sheave, effect the desired bend. The machine is adapted to slightly bend a pipe or tube or to bend it to any desired angle or in any desired curve, according to the manipulation of the two handles of the machine.

Figure 1:
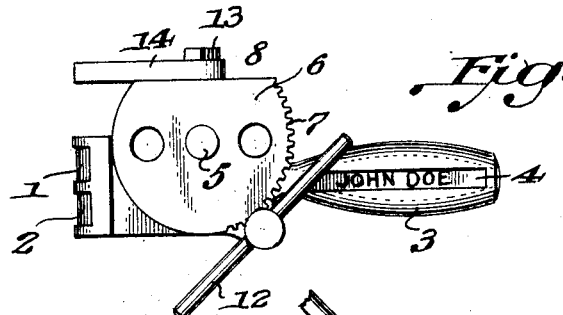
Figure 1, is a side elevation.
Figure 2:
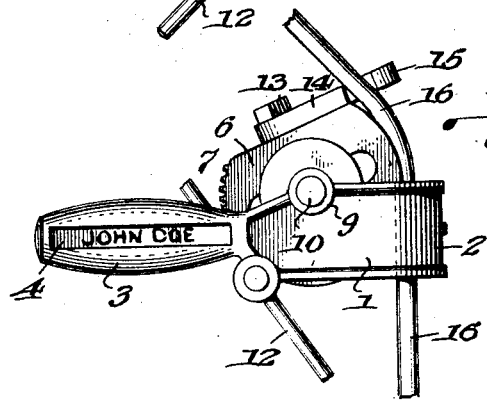
Fig. 2, is a side elevation showing how a pipe or tube is bent by the appliance.
Figure 3:
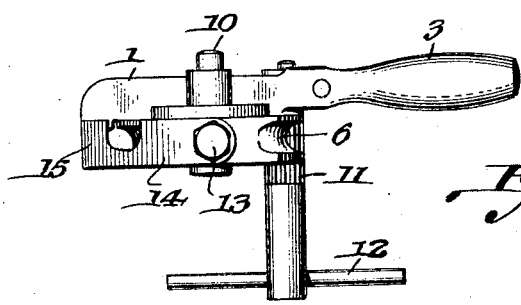
Fig. 3, is a plan view.
Figure 4:
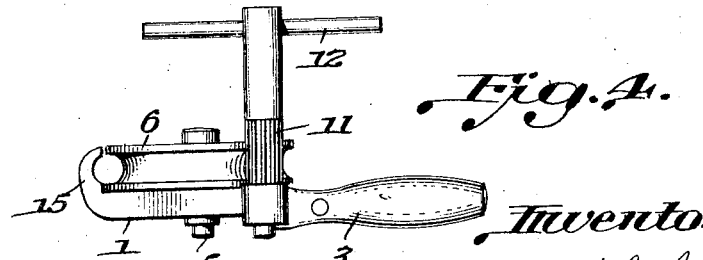
Fig. 4, is a bottom view.

The body 1 is provided with a hook 2 and a handle 3, rigidly connected to, or integral with, said body. A depressed surface 4 may be provided in the handle to receive the name and address of the manufacturer.

A headed pin 5, which is secured to and projects from the body 1, serves as a stub-shaft to mount a sheave 6 which has gear teeth or a mutilated gear 7 and is provided with a flattened part 8.

Mounted to turn in a bearing 9 on the body 1, is the shaft 10 having a pinion 11 meshing with teeth 7 and provided with a handle 12.

Secured to the flattened part 8 by a machine screw 13 is a bending plate 14 having a hook 15.

A piece of tube or pipe undergoing bending is shown at 16.

If desired, the inner surface of hook 15 may have teeth, or corrugations to better grip the tube or pipe 16.

Having turned the handle 12 to position the hook 15 opposite the groove in sheave 6, the tube or pipe 16 is passed through the hook 2 and engaged with hook 15.

The operator grasps handles 3 and 12 and turns the latter to bend the pipe or tube into the curve or angle desired. The diameter of pinion 11 being small in relation to that of sheave 6, the tube or pipe is easily bent. As the appliance is light and small it may be readily carried about by the user.

What we claim is:

The hereindescribed portable pipe and tube bender, comprising a body having a pipe-engaging hook at one end and a handle at its other end to enable said bender to be held by the operator, a sheave having a grooved edge and journalled to the body, said sheave being provided with gear teeth, said sheave and hook lying in substantially the same plane, an elongated bending plate attached to the sheave and lying in the plane thereof, said plate having a hooked end projecting over the grooved edge of the sheave and adapted to grip the pipe or tube to be bent, the first-named hook serving as an abutment for the pipe or tube, a shaft mounted on the body and provided with a pinion which meshes with the gear teeth of the sheave, and a handle whereby said shaft may be turned.

In testimony whereof we affix our signatures.

WALTER ESTES HOLSCLAW.
HARRY ELSTON HOLSCLAW.